UNITED STATES PATENT OFFICE.

GUSTAVE GUIRAUD, OF CRIPPLECREEK, COLORADO, ASSIGNOR TO ROBERT McKNIGHT, OF PHILADELPHIA, PENNSYLVANIA.

ART OF TREATING ORES CONTAINING SILICA OR SILICATES.

SPECIFICATION forming part of Letters Patent No. 702,943, dated June 24, 1902.

Application filed October 21, 1901. Serial No. 79,408. (No specimens.)

*To all whom it may concern:*

Be it known that I, GUSTAVE GUIRAUD, a citizen of the United States, residing at Cripplecreek, in the county of Teller and State of Colorado, have invented new and useful Improvements in the Art of Treating Ores Containing Silica or Silicates, of which the following is a specification.

My invention relates to the recovery of metal values from ores containing silicon in combination with oxygen and other elements by a volatilization process, in which the pulverized ore is roasted with an alkaline haloid, the principal phase of the reaction being the formation of a stable silicate of the alkaline or alkaline-earth metal and a haloid of such of the precious metal as may be in a very finely-divided state, while the larger particles of the precious metal are cleansed by the chlorin with the assistance of heat and made ready for amalgamation or other treatment suitable for free milling ores.

Describing now more fully the details of the best method of which I am at present aware of carrying out my invented art, first I form a mixture of the ore containing silica or the silicates with a sufficient quantity of common salt, (NaCl,) the salt being in sufficient quantity to furnish sufficient nascent chlorin for the formation into a chlorid of the metal, that is in a finely-divided state, and for the cleansing with the assistance of heat of the surface of the particles that may be of larger size and which will subsequently be treated by amalgamation.

Supposing now we take as an example of my process an ore which contains a silicate or silica, the reaction would be as follows: Taking into consideration an ore containing silica from which the actions in an ore containing silicates could easily be seen, the silica becomes oxidized by the roasting to silicic anhydrid, and this may become in time silicic acid when a sufficient amount of moisture is introduced. From this the hydrogen is displaced by the alkaline or alkaline-earth metal, forming a silicate of this metal, or the silicate of the alkaline or alkaline-earth metal may be formed directly. This phase, however, is present, taking an example of a simple silicious ore:

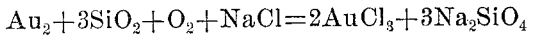

$$Au_2 + 3SiO_2 + O_2 + NaCl = 2AuCl_3 + 3Na_2SiO_4$$

In the practical carrying out of my invention a suitable furnace is provided in which the mixture of ore and salt is roasted with free access of air and is agitated or rabbled, heat being applied at a temperature varying from 500° to 1,000° centigrade, according to the ore. The reaction takes place and the fumes containing the metal values are caught and recovered. Preferably, of course, the metal values have been kept away from the products of combustion and are collected separately therefrom; but in some cases the two can be allowed to pass off together, and the fumes of the haloid compound of the precious metal are separated and collected by blankets or by some other suitable means. The haloid compounds of the metals, when collected, are treated in any suitable manner to secure the values. After the roasting the metal (gold, silver, copper, &c.) remaining in the ore, should there be any, will have been thoroughly cleansed by the action of the chlorin and heat and can be treated precisely as any free milling ore.

Having now described my invention, what I claim, and desire to secure by Letters Patent, is—

1. The art of treating ores, which consists in roasting with free access of air and agitation, a charge containing the ore, silicon in an oxygen combination, and a haloid salt of an alkaline or alkaline-earth metal, the quantities being substantially those quantitatively requisite to form a stable silicate of the alkaline or alkaline-earth metal, and a haloid of the precious metal and continuing the heating of the ore until the haloid of the precious metal is volatilized and collecting the precious-metal values as haloids or oxyhaloids substantially as described.

2. The art of treating ores, which consists in roasting, with free access of air and agitation, a charge containing the ore, silicon in an oxygen combination, and a chlorid of an alkaline or alkaline-earth metal, the quantities being those quantitatively requisite to form a stable silicate of the alkaline-earth metal, and continuing the heating of the ore until the chlorid of the precious metal is volatilized and collecting the precious-metal values as chlorids, or oxychlorids, substantially as described.

3. The art of treating ores, which consists in roasting, with free access of air and agitation, a charge containing the ore, silicon in an oxygen combination, and a haloid salt of an alkaline or alkaline-earth metal, the quantities being substantially those quantitatively requisite to form a stable silicate of the alkaline or alkaline-earth metal, and a haloid of the precious metal, and continuing the heating of the ore until the haloid of the metal to be recovered, is volatilized, and carrying off and collecting separate from the fumes of combustion, the precious-metal values as haloids or oxyhaloids substantially as described.

In testimony whereof I affix my signature in presence of two witnesses.

GUSTAVE GUIRAUD.

Witnesses:
J. J. MURPHY,
J. S. MILLIGAN.